(12) United States Patent
Nagai et al.

(10) Patent No.: US 11,936,200 B2
(45) Date of Patent: Mar. 19, 2024

(54) WIRELESS POWER SUPPLY SYSTEM

(71) Applicant: Murata Manufacturing Co., Ltd., Kyoto-fu (JP)

(72) Inventors: Takahiro Nagai, Nagaokakyo (JP); Tatsuya Hosotani, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 225 days.

(21) Appl. No.: 17/470,770

(22) Filed: Sep. 9, 2021

(65) Prior Publication Data
US 2021/0408830 A1    Dec. 30, 2021

Related U.S. Application Data

(63) Continuation of application No. PCT/JP2019/047982, filed on Dec. 9, 2019.

(30) Foreign Application Priority Data

Mar. 14, 2019   (JP) .................................. 2019-046665

(51) Int. Cl.
*H02J 50/12*    (2016.01)
*H02J 7/00*    (2006.01)

(52) U.S. Cl.
CPC ............ *H02J 50/12* (2016.02); *H02J 7/0049* (2020.01); *H02J 7/00712* (2020.01)

(58) Field of Classification Search
None
See application file for complete search history.

(56) References Cited

U.S. PATENT DOCUMENTS 10,291,082 B2 *   5/2019   Onishi ................. H02J 7/0068
10,622,141 B2 *   4/2020   Kawai ................. H04B 5/0037
(Continued)

FOREIGN PATENT DOCUMENTS

JP   2008-178195 A   7/2008
JP   2013-005527 A   1/2013

OTHER PUBLICATIONS

International Search Report issued in PCT/JP2019/047982; dated Jan. 21, 2020.
(Continued)

*Primary Examiner* — Jeffrey S Zweizig
(74) *Attorney, Agent, or Firm* — Studebaker & Brackett PC

(57) ABSTRACT

High-frequency power is supplied from a power transmitter to a power receiver using an electromagnetic resonance phenomenon between the power transmitter and the power receiver. The power receiver converts the high-frequency power into a power reception direct-current power to charge a battery. A power reception control unit in the power receiver detects a state of charge of the battery and generates a power transmission stop signal on the basis of the state of charge of the battery. A resonance modulation circuit in the power receiver changes resonance conditions in response to the power transmission stop signal. An MPU in the power transmitter demodulates the power transmission stop signal based on an electric variable from a power transmission direct-current power supply due to a change in the resonance conditions and stops an operation of supplying the high-frequency power in a transmission power conversion circuit for a predetermined period.

14 Claims, 17 Drawing Sheets

(56) References Cited

U.S. PATENT DOCUMENTS

| | | | |
|---|---|---|---|
| 10,756,577 B2* | 8/2020 | Hosotani | H02J 50/80 |
| 11,043,842 B2* | 6/2021 | Onishi | H02J 50/10 |
| 11,101,696 B2* | 8/2021 | Hosotani | H02J 50/90 |
| 11,114,950 B2* | 9/2021 | Hosotani | H02J 7/0063 |

OTHER PUBLICATIONS

Written Opinion of the International Searching Authority issued in PCT/JP2019/047982; dated Jan. 21, 2020.

* cited by examiner

WIRELESS POWER SUPPLY SYSTEM

CROSS-REFERENCE TO RELATED APPLICATIONS

This application claims benefit of priority to International Patent Application No. PCT/JP2019/047982, filed Dec. 9, 2019, and to Japanese Patent Application No. 2019-046665, filed Mar. 14, 2019, the entire contents of each are incorporated herein by reference.

BACKGROUND

Technical Field

The present disclosure relates to a wireless power supply system for wirelessly supplying power from a power transmitter to a power receiver using electromagnetic coupling.

Background Art

The non-contact power transmission system disclosed in Japanese Unexamined Patent Application Publication No. 2008-178195 includes a power transmitter and a power receiver. The power transmitter includes a power transmission control circuit. The power receiver includes a power reception control circuit.

When the power reception control circuit detects the full-charge state of a battery, the power reception control circuit transmits a full-charge command to the power transmission control circuit. Upon receiving the full-charge command, the power transmission control circuit stops normal power transmission and performs intermittent power transmission.

When the power reception control circuit detects that the battery needs to be recharged, the power reception control circuit transmits a recharge command to the power transmission control circuit. Upon receiving the recharge command, the power transmission control circuit stops the intermittent power transmission and performs the normal power transmission.

SUMMARY

In the wireless power supply system disclosed in Japanese Unexamined Patent Application Publication No. 2008-178195, the power reception control circuit requires a wireless transmission circuit for transmitting a command to the power transmission control circuit and the power transmission control circuit requires a wireless reception circuit for receiving a command. The inclusion of the wireless transmission circuit and the wireless reception circuit in the power transmitter and the power receiver leads to a complex and large system. There is a case where high-frequency power in power transmission and power reception and a radio signal in wireless transmission and wireless reception interfere with each other, the malfunction of power conversion control occurs, and a system is broken.

Accordingly, a simple, small, high-reliability, and power-thrifty wireless power supply system is needed which does not need a wireless transmission circuit and a wireless reception circuit in a power transmitter and a power receiver.

The present disclosure provides a simple, small, high-reliability, and power-thrifty wireless power supply system including a power transmitter and a power receiver.

A wireless power supply system according to the present disclosure includes a power transmitter and a power receiver. The power transmitter includes a power transmission power conversion circuit, a power transmission resonant circuit, and a power transmission control circuit. The power transmission power conversion circuit converts a power transmission direct-current power supply into high-frequency power. The power transmission resonant circuit includes a power transmission coil forming the power transmission power conversion circuit. The power transmission control circuit controls the power transmission power conversion circuit. The power receiver includes a power reception resonant circuit, a power reception power conversion circuit, and a battery. The power reception resonant circuit includes a power reception coil and can be electromagnetically coupled to the power transmission resonant circuit. The power reception power conversion circuit converts the high-frequency power received by the power reception resonant circuit into a power reception direct-current power supply. The battery is charged with the power reception direct-current power supply.

The power receiver further includes a power reception control circuit, and a resonance modulation circuit. The charge state detection circuit detects a state of charge of the battery. The power reception control circuit includes the charge state detection circuit and generates a power transmission stop signal based on a state of charge of the battery detected by the charge state detection circuit. The resonance modulation circuit changes resonance conditions by changing an input impedance when the power reception resonant circuit is viewed from the power transmission resonant circuit in response to the power transmission stop signal.

The power transmitter includes an electric variable detection circuit that detects an electric variable from the power transmission direct-current power supply due to a change in the resonance conditions. The power transmission control circuit demodulates the power transmission stop signal based on the electric variable detected by the electric variable detection circuit and stops an operation of supplying the high-frequency power in the transmission power conversion circuit for a predetermined period.

In this configuration, when there is no need to charge the battery, the power receiver makes a notification about the stop of power transmission by changing resonance conditions through a power supply path. The power transmitter detects the stop of power transmission by detecting the change in resonance conditions to stop power transmission. Thus, when there is no need to charge the battery, the power transmitter stops the operation thereof to reduce power consumption. Since both of the power transmitter and the power receiver do not need additional circuits for the stop of power transmission, they can achieve simple circuit configurations and power savings.

According to the present disclosure, there can be provided a simple, small, high-reliability, and power-thrifty wireless power supply system.

DETAILED DESCRIPTION

Figure 1:
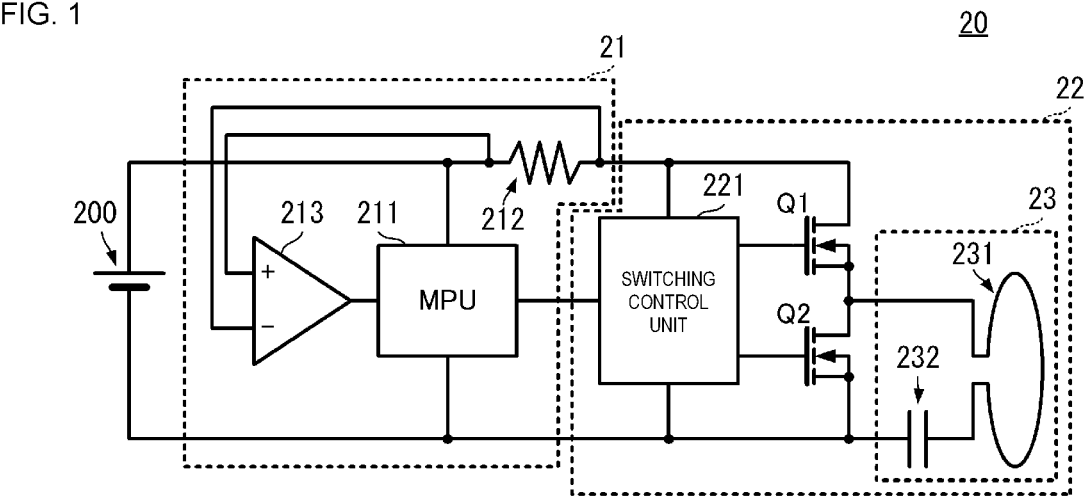
FIG. 1 is a diagram illustrating the configuration of a power transmitter in a wireless power supply system according to an embodiment of the present disclosure.
Figure 2:
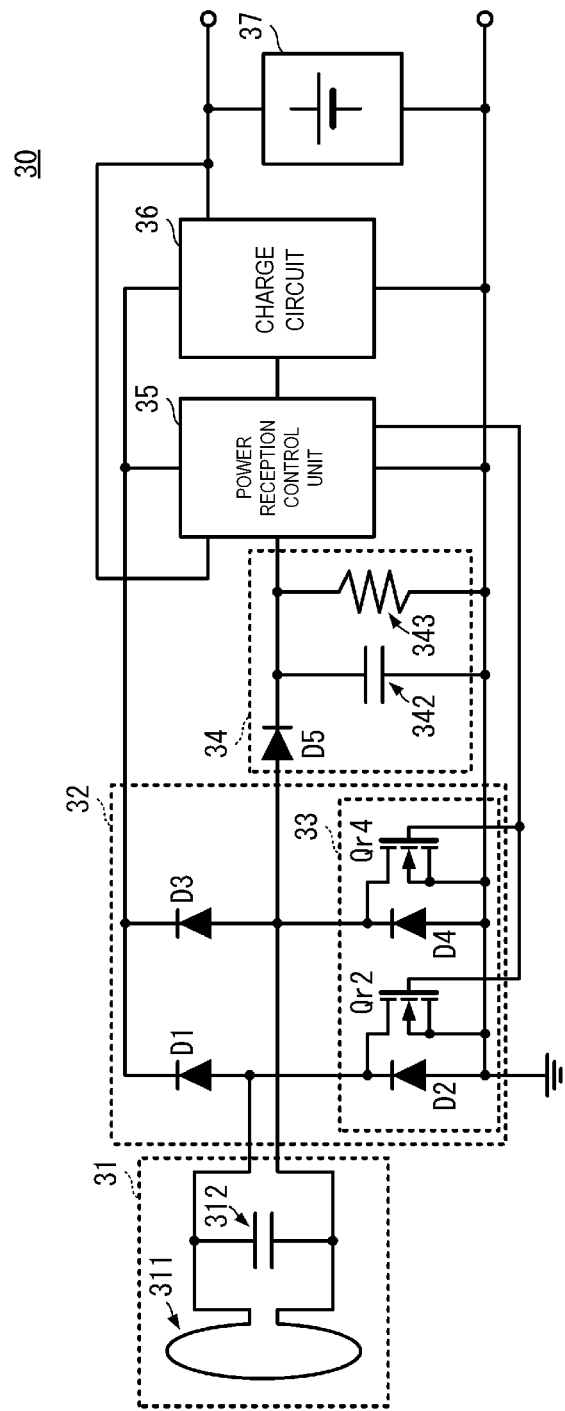
FIG. 2 is a diagram illustrating the configuration of a power receiver in a wireless power supply system according to an embodiment of the present disclosure.

A wireless power supply system according to an embodiment of the present disclosure will be described with reference to drawings. FIG. 1 is a diagram illustrating the configuration of a power transmitter 20 in a wireless power supply system according to an embodiment of the present disclosure. FIG. 2 is a diagram illustrating the configuration of a power receiver 30 in a wireless power supply system according to an embodiment of the present disclosure.

(Circuit Configuration)

A wireless power supply system according to an embodiment of the present disclosure includes the power transmitter 20 and the power receiver 30.

(Circuit Configuration of the Power Transmitter 20)

As illustrated in FIG. 1, the power transmitter 20 includes a power transmission control circuit 21 and a power transmission power conversion circuit 22. The power transmission control circuit 21 includes an MPU 211, a detection element 212, and a differential amplifier 213. The detection element 212 and the differential amplifier 213 form an electric variable detection circuit.

A direct-current power supply 200 is connected to the MPU 211. The MPU 211 receives the supply of power from the direct-current power supply 200 via an LDO (not illustrated).

The detection element 212 is a resistance element. One end of the detection element 212 is connected to the direct-current power supply 200 and the other end of the detection element 212 is connected to the drain of a switching element Q1 in the power transmission power conversion circuit 22.

The non-inverting input terminal of the differential amplifier 213 is connected to one end of the detection element 212 and the inverting input terminal of the differential amplifier 213 is connected to the other end of the detection element 212. The output terminal of the differential amplifier 213 is connected to the MPU 211.

The power transmission power conversion circuit 22 includes a switching control unit 221, the switching element Q1, a switching element Q2, and a power transmission resonant circuit 23. The power transmission resonant circuit 23 includes a power transmission coil 231 and a resonant capacitor 232.

The switching control unit 221 receives the supply of power from the direct-current power supply 200. The switching control unit 221 is connected to the MPU 211. The switching control unit 221 is connected to the gate of the switching element Q1 and the gate of the switching element Q2.

The drain of the switching element Q1 is connected to the positive electrode of the direct-current power supply 200 via the detection element 212. The source of the switching element Q1 is connected to the drain of the switching element Q2. The source of the switching element Q2 is connected to the negative electrode of the direct-current power supply 200.

The power transmission coil 231 and the resonant capacitor 232 are connected in series. This series circuit is connected in parallel with the switching element Q2. More specifically, the power transmission coil 231 is connected to a node between the drain of the switching element Q2 and the source of the switching element Q1. The resonant capacitor 232 is connected to the source of the switching element Q2.

(Circuit Configuration of the Power Receiver 30)

As illustrated in FIG. 2, the power receiver 30 includes a power reception resonant circuit 31, a power reception power conversion circuit 32, a resonance modulation circuit 33, an intermittent power reception detection circuit 34, a power reception control unit 35, a charge circuit 36, and a battery 37. The intermittent power reception detection circuit 34 does not necessarily have to be provided.

The power reception resonant circuit 31 includes a power reception coil 311 and a resonant capacitor 312. The resonant capacitor 312 is connected in parallel with the power reception coil 311.

The power reception power conversion circuit 32 includes diodes D1, D2, D3, and D4. The diodes D1 and D2 are connected in series. The diodes D3 and D4 are connected in series. A series circuit of the diodes D1 and D2 is connected in parallel with a series circuit of the diodes D3 and D4. More specifically, the anode of the diode D1 and the cathode of the diode D2 are connected and a node between them is connected to one end of the power reception coil 311. The anode of the diode D3 and the cathode of the diode D4 are connected and a node between them is connected to the other end of the power reception coil 311. The cathode of the diode D1 and the cathode of the diode D3 are connected and a node between them is connected to the power reception control unit 35 and the charge circuit 36. The anode of the diode D2 and the anode of the diode D4 are connected to a reference potential.

The resonance modulation circuit 33 includes switching elements Qr2 and Qr4. The switching element Qr2 is connected in parallel with the diode D2. The switching element Qr4 is connected in parallel with the diode D4. The gates of the switching element Qr2 and Qr4 are connected to the power reception control unit 35. The resonance modulation circuit 33 corresponds to a "power reception resonance modulation circuit" according to the present disclosure.

The intermittent power reception detection circuit 34 includes a diode D5, a capacitor 342, and a resistor 343. The anode of the diode D5 is connected to a node between the diodes D3 and D4. The cathode of the diode D5 is connected to the power reception control unit 35. The capacitor 342 is connected between the cathode of the diode D5 and the reference potential. The resistor 343 is connected in parallel with the capacitor 342.

The power reception control unit 35 is connected to the charge circuit 36. The charge circuit 36 is connected to the battery 37.

(Summary of Power Supply Control)

In summary, the power transmitter 20 and the power receiver 30 perform power transmission control to be described below. Details of power transmission control performed by the power transmitter 20 will be described below.

(Normal (Initial) Charge Control)

When the power transmitter 20 is turned on, the MPU 211 outputs a driving signal to the switching control unit 221.

Upon receiving the driving signal from the MPU 211, the switching control unit 221 controls the ON and OFF of the switching elements Q1 and Q2 by performing, for example, PWM control. The power transmission power conversion circuit 22 converts a power transmission direct-current power supply supplied from the direct-current power supply 200 into high-frequency power, and the high-frequency power is supplied to the power transmission resonant circuit 23. The frequency of the high-frequency power is associated with the resonant frequency of the power transmission resonant circuit 23.

The power transmission coil 231 and the power reception coil 311 cause an electromagnetic resonance phenomenon with high-frequency power (high-frequency current). The power reception coil 311 therefore generates a high-frequency current.

The power reception power conversion circuit 32 rectifies the high-frequency current to generate a power reception direct-current power supply and outputs the power reception direct-current power supply to the power reception control unit 35 and the charge circuit 36. The charge circuit 36 charges the battery 37 with the power reception direct-current power supply.

(Power Transmission Stop Control)

The power reception control unit 35 acquires the charge voltage (battery voltage) of the battery 37. The power reception control unit 35 generates a power transmission stop signal in accordance with the battery voltage (the state of charge). More specifically, the power reception control unit 35 generates a power transmission stop signal when a battery voltage VBAT is higher than or equal to a full charge voltage VF. The power transmission stop signal is a signal for performing on-off control of the switching elements Qr2 and Qr4. The power reception control unit 35 outputs the power transmission stop signal to the switching elements Qr2 and Qr4.

The switching elements Qr2 and Qr4 are subjected to on-off control in response to the power transmission stop signal. As a result, an input impedance when the power reception resonant circuit 31 is viewed from the power transmission resonant circuit 23 varies and resonance conditions change.

Figure 3:
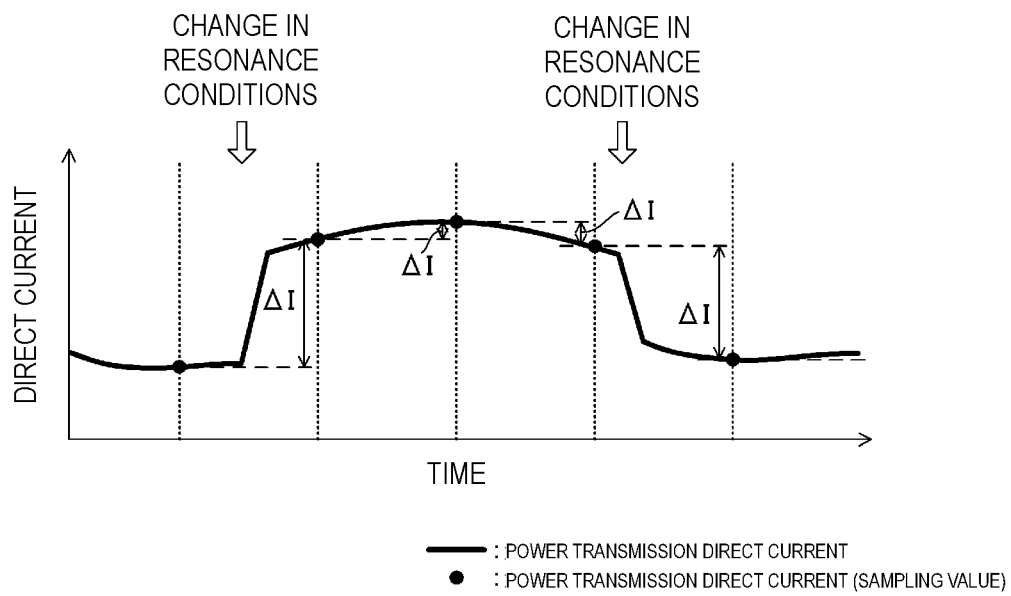
FIG. 3 is a graph representing an exemplary change in a power transmission direct current with a change in resonance conditions.

FIG. 3 is a graph representing an exemplary change in a power transmission direct current with a change in resonance conditions. As illustrated in FIG. 3, the direct current (power transmission direct current) of the power transmitter 20 markedly changes with a change in resonance conditions. The change in resonance conditions occurs in response to a power transmission stop signal as described above. Accordingly, by detecting a rapid change in a power transmission direct current, a power transmission stop signal is demodulated.

When a power transmission direct current changes, a voltage across the detection element 212 changes. The output of the differential amplifier 213 therefore changes. Accordingly, by detecting the change in the output of the differential amplifier 213, the MPU 211 detects the change in a power transmission direct current to detect a power transmission stop signal. For example, the MPU 211 discretely samples a power transmission direct current (the output of the differential amplifier 213) and detects a difference ΔI between adjacent power transmission direct currents (the output voltages of the differential amplifier 213) as illustrated in FIG. 3. The MPU 211 detects "0" when the difference ΔI between power transmission direct currents does not exceed a threshold value and "1" when the difference ΔI between power transmission direct currents exceed the threshold value. For example, the MPU 211 demodulates a power transmission stop signal with the combination of the data of "0" and the data of "1". In reality, the MPU 211 detects a power transmission stop signal based on the output of the differential amplifier 213.

When the MPU 211 demodulates a power transmission stop signal and detects that power transmission is to be stopped, it stops the output of a driving signal to the switching control unit 221. The power transmission power conversion circuit 22 therefore stops the supply of high-frequency power to the power transmission resonant circuit 23. As a result, the power transmitter 20 stops the supply of power to the power receiver 30. At that time, the MPU 211 is bought into a power saving mode and performs only the detection of a power transmission start signal to be described below.

(Power Transmission Start Control)

The power reception control unit 35 acquires the charge voltage (battery voltage) of the battery 37. The power reception control unit 35 generates a power transmission start signal in accordance with the battery voltage (a state of charge). More specifically, when the battery voltage VBAT is lower than a charge start voltage VR, the power reception control unit 35 generates a power transmission start signal. The charge start voltage VR is set as appropriate depending on the situation as will be described below. The power transmission start signal is a signal for performing on-off control of the switching elements Qr2 and Qr4. A power transmission start signal has a pattern different from that of a power transmission stop signal. The power reception control unit 35 outputs a power transmission start signal to the switching elements Qr2 and Qr4.

The switching elements Qr2 and Qr4 are subjected to on-off control in accordance with the power transmission start signal. As a result, an input impedance when the power reception resonant circuit 31 is viewed from the power transmission resonant circuit 23 varies and resonance conditions change.

As described above, the direct current (power transmission direct current) of the power transmitter 20 markedly changes with a change in resonance conditions. By detecting a change in the output of the differential amplifier 213, the MPU 211 detects a change in a power transmission direct current to detect a power transmission start signal.

When the MPU 211 demodulates a power transmission start signal and detects that power transmission is to be started, it starts the output of a driving signal to the switching control unit 221. The power transmission power conversion circuit 22 therefore starts the supply of high-frequency power to the power transmission resonant circuit 23. As a result, the power transmitter 20 starts the supply of power to the power receiver 30.

Thus, with a configuration according to this embodiment, the charge of the battery 37 can be performed and stopped without providing a wireless transmission circuit and a wireless reception circuit in the power transmitter 20 and the power receiver 30. Accordingly, the present disclosure can provide a simple, small, high-reliability, and power-thrifty wireless power supply system.

Figure 4:
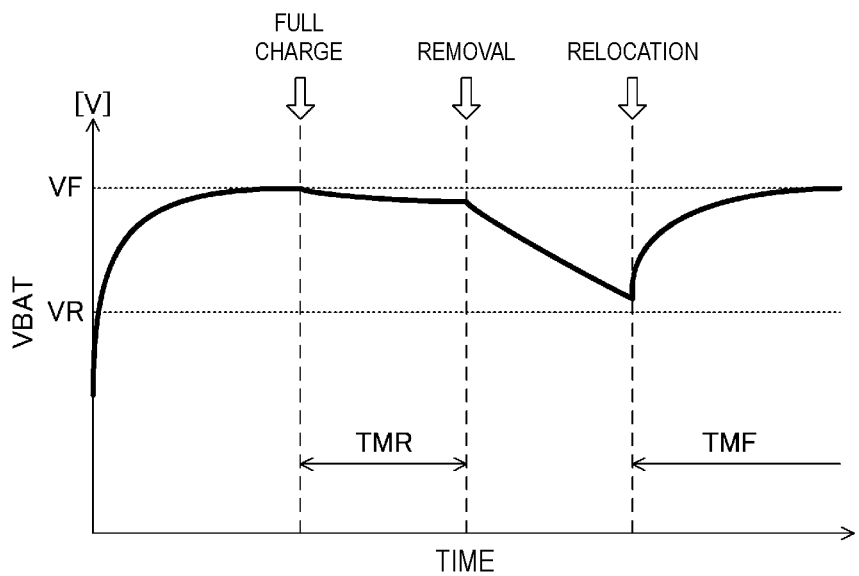
FIG. 4 is a graph illustrating an example of a transition of a battery voltage.

The normal power transmission according to an aspect, the stop of power transmission according to an aspect, and the start of power transmission according to an aspect have been schematically described above. In the following, various controls according to respective aspects performed by a wireless power supply system according to the present disclosure will be described in detail below. FIG. 4 is a graph illustrating an example of a transition of a battery voltage. FIG. 4 is referred to as appropriate in the following descriptions of respective aspects.

(Power Supply Control According to First Aspect)

Figure 5:
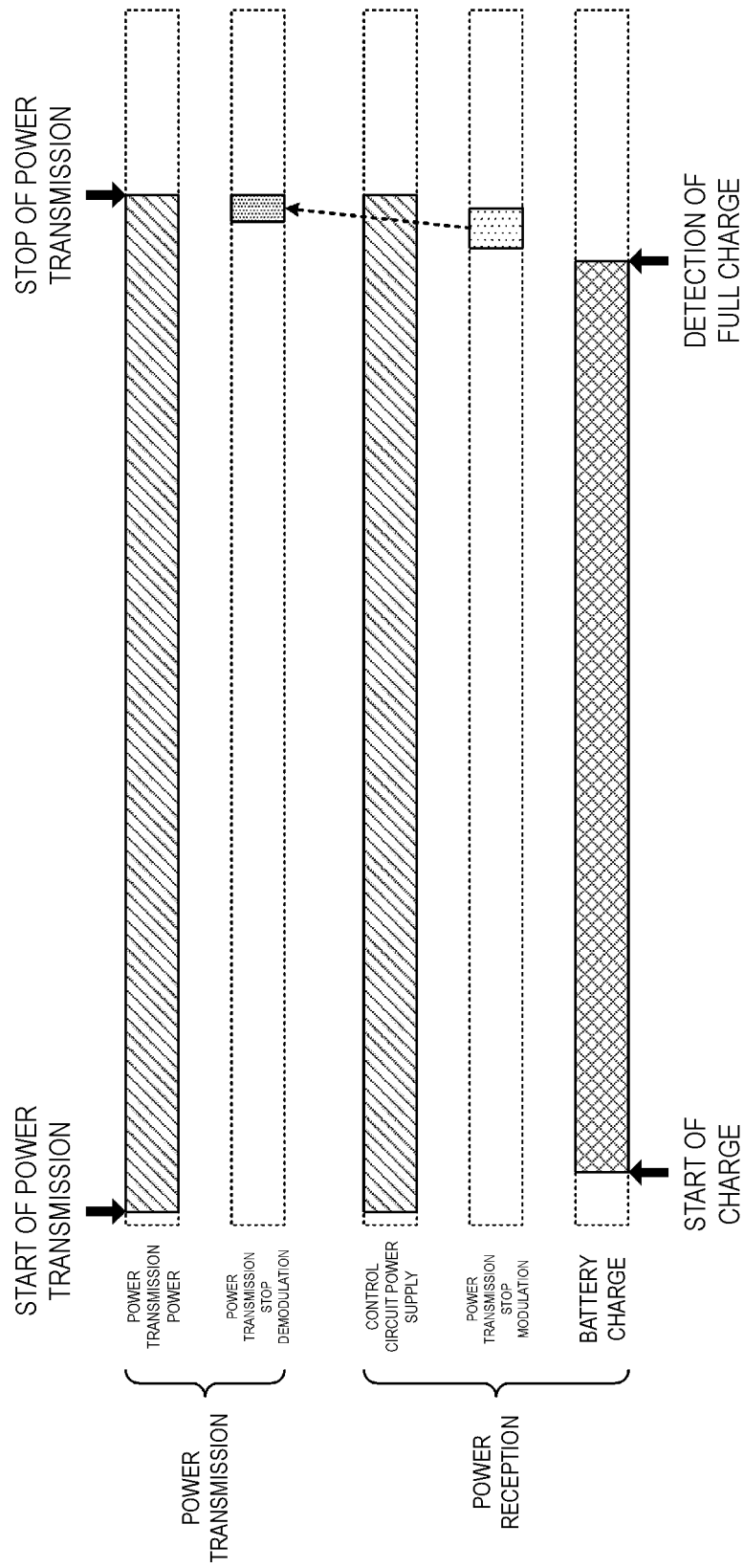
FIG. 5 is a time chart of power supply control according to a first aspect performed by a wireless power supply system.

FIG. 5 is a time chart of power supply control according to the first aspect performed by a wireless power supply system. The first aspect illustrated in FIG. 5 is an example of control performed until the full charge of the battery 37 in the power receiver 30 is completed.

The power transmitter 20 is in the power-on state, and the power transmitter 20 and the power receiver 30 are disposed such that the magnetic resonance between the power transmission coil 231 and the power reception coil 311 can be established. In this state, the power transmitter 20 starts power transmission. The power receiver 30 supplies power to the power reception control unit 35 with a power reception direct-current power supply. At the same time, the power reception control unit 35 starts to charge the battery 37 via the charge circuit 36.

When the battery 37 is brought into a full-charge state, the power reception control unit 35 detects the full charge and generates a power transmission stop signal. That is, when the power reception control unit 35 detects that the battery voltage VBAT is higher than or equal to the full charge voltage VF, it generates a power transmission stop signal. The power transmission stop signal is transmitted from the power receiver 30 to the power transmitter 20 using resonance modulation.

When the MPU 211 performs power transmission stop demodulation, the power transmitter 20 stope the transmission of power to the power receiver 30. Subsequently, the power transmitter 20 and the power receiver 30 are brought into a sleep state. For example, the power transmitter 20 performs only the power transmission stop demodulation function and the power receiver 30 stops all charge functions.

By performing the above control using the above configuration, the power consumption of the power transmitter 20 and the power receiver 30 is further reduced.

Figure 6:
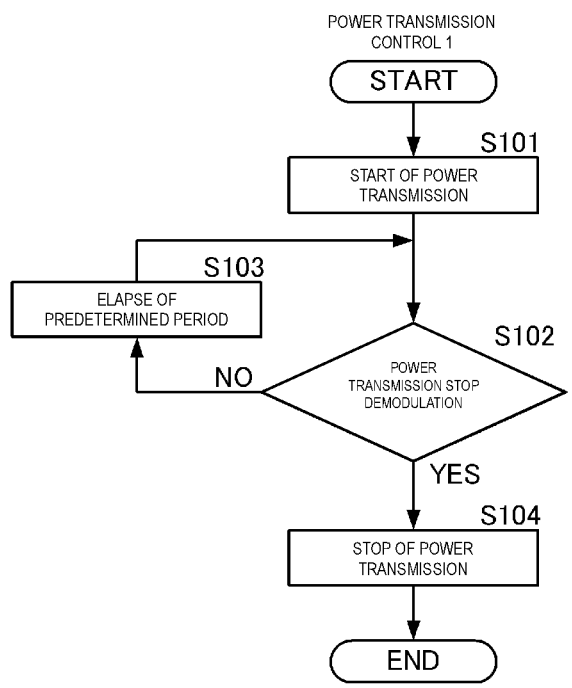
FIG. 6 is a flowchart of control according to the first aspect performed by a power transmitter.

In this power supply control according to the first aspect, the power transmitter 20 performs the following process flow. FIG. 6 is a flowchart of control according to the first aspect performed by the power transmitter 20.

The power transmitter 20 starts power transmission (S101). When power transmission stop demodulation is not performed (NO in S102), the power transmitter 20 determines whether the power transmission stop demodulation is performed after a predetermined period has elapsed (S103). The power transmitter 20 repeats this control until the power transmission stop demodulation is performed.

When the power transmission stop demodulation is performed (YES in S102), the power transmitter 20 stops the power transmission (S104).

Figure 7:
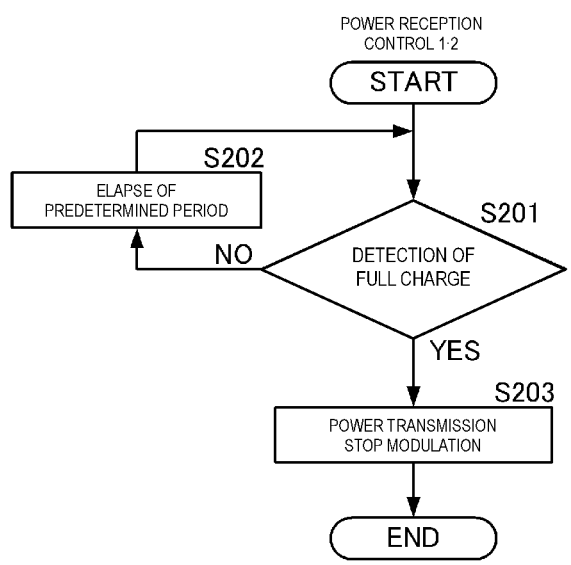
FIG. 7 is a flowchart of control according to the first aspect performed by a power receiver.

In this power supply control according to the first aspect, the power receiver 30 performs the following process flow. FIG. 7 is a flowchart of control according to the first aspect performed by the power receiver 30.

When the power receiver 30 does not detect full charge (NO in S201), it checks full charge again after a predetermined period has elapsed (S202).

When the power receiver 30 detects full charge (YES in S201), it generates a power transmission stop signal and causes resonance modulation representing the stop of power transmission (S203).

(Power Supply Control According to Second Aspect)

Figure 8:
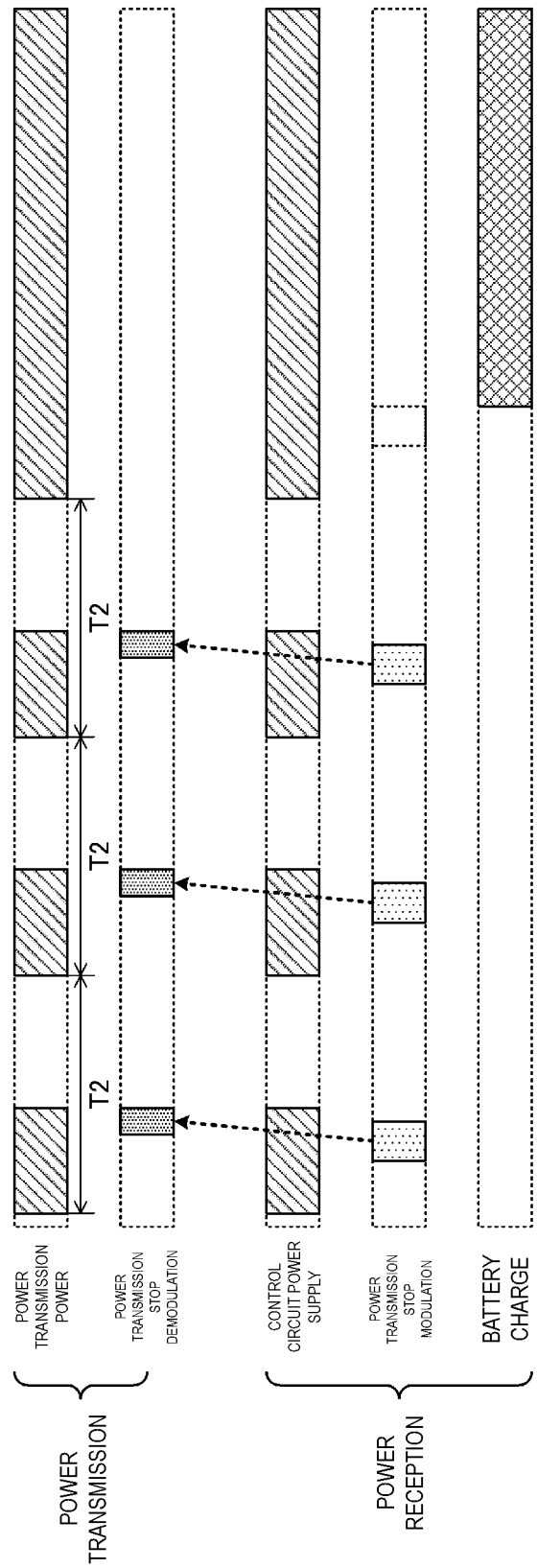
FIG. 8 is a time chart of power supply control according to a second aspect performed by a wireless power supply system.

FIG. 8 is a time chart of power supply control according to the second aspect performed by a wireless power supply system. The second aspect illustrated in FIG. 8 is an example of control at the time of restart of power transmission of the power transmitter 20.

The power transmitter 20 performs short-term power transmission at predetermined time intervals T2, for example, after the detection of fill charge. The power reception control unit 35 in the power receiver 30 is activated by the short-term power transmission. When the power reception control unit 35 detects the full charge of the battery 37, it generates a power transmission stop signal. Specifically, when the battery voltage VBAT is not less than a charge restart threshold value (is kept greater than or equal to the threshold value), the power reception control unit 35 generates a power transmission stop signal. The charge restart threshold value may be, for example, the full charge voltage VF or the charge start voltage VR. The charge start voltage VR is lower than the full charge voltage VF and may be set as appropriate.

The power transmitter 20 continues the stop of continuous transmission of power to the power receiver 30 each time the MPU 211 performs power transmission stop demodulation. That is, the power transmitter 20 intermittently repeats short-term power transmission.

When the power reception control unit 35 in the power receiver 30 detects that the battery 37 needs to be charged, it stops the generation of a power transmission stop signal. Specifically, the power reception control unit 35 stops the generation of a power transmission stop signal upon detecting that the battery voltage VBAT is less than the charge restart threshold value.

When the MPU 211 in the power transmitter 20 cannot perform power transmission stop demodulation, it starts continuous power transmission to the power receiver 30.

By performing the above control using the above configuration, the wireless power supply system can continuously detect the full-charge state of the battery 37, and automatically charge the battery 37 to bring the battery 37 into the full-charge state when the battery 37 is not in the full-charge state. At that time, the power transmitter 20 can perform continuous power transmission only when the charge of the battery 37 is needed. Accordingly, the power consumption of the power transmitter 20 is reduced. The power receiver 30 operates only during the minimum period required for the detection of full charge. Accordingly, the power consumption of the power receiver 30 is also reduced.

When the charge restart threshold value is set to the full charge voltage VF, the wireless power supply system can continue to keep the battery voltage VBAT of the power receiver 30 in the full-charge state. When the charge restart threshold value is set to the charge start voltage VR, the wireless power supply system can keep the battery voltage VBAT of the power receiver 30 at a desired voltage or higher. In the case where the charge restart threshold value is set to the charge start voltage VR, the wireless power supply system can reduce the number of times of charge as compared with the case where the charge restart threshold value is set to the full charge voltage VF.

Figure 9:
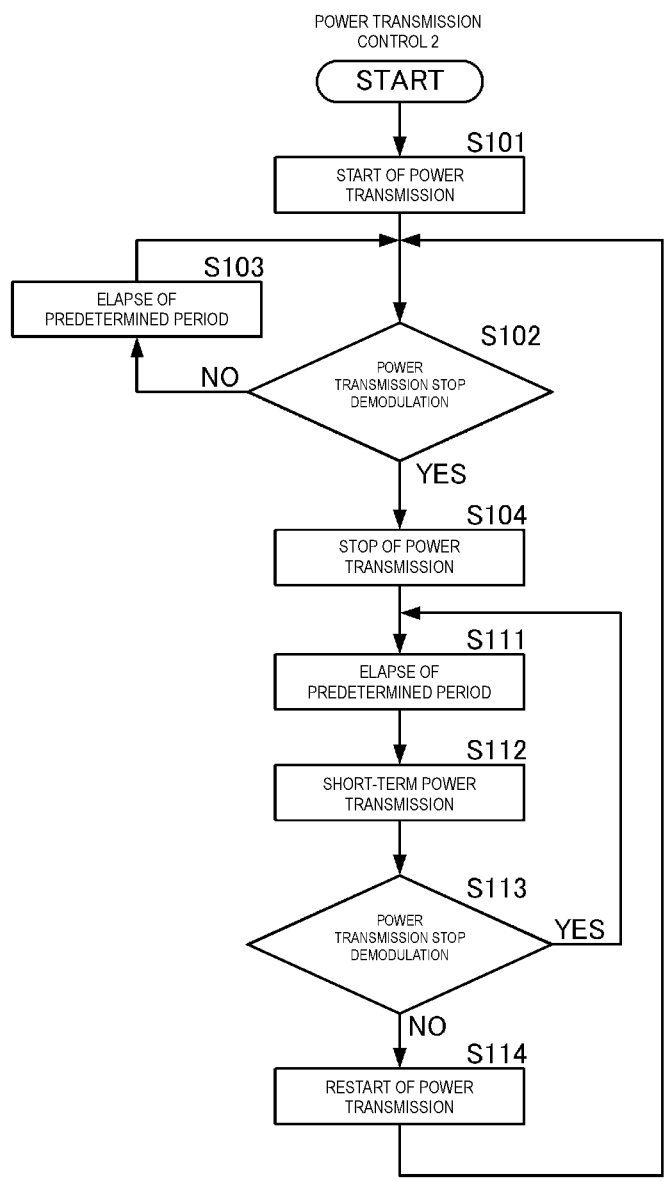
FIG. 9 is a flowchart of control according to the second aspect performed by the power transmitter.

In this power supply control according to the second aspect, the power transmitter 20 performs, for example, the following process flow. FIG. 9 is a flowchart of control according to the second aspect performed by the power transmitter 20. In the flowchart in FIG. 9, the process to step S104 is the same as that in FIG. 6, and the description of the same point will be omitted. The power receiver 30 performs the above control illustrated in FIG. 7.

The power transmitter 20 stops power transmission (S104), waits until a predetermined period of time set on the basis of the time interval T2 has elapsed (S111), and performs short-term power transmission (S112). In the short-term power transmission, power is supplied which is required for the power reception control unit 35 to detect the charge voltage of the battery 37 and generate a power transmission stop signal.

When the MPU 211 can perform power transmission stop demodulation (YES in S113), the power transmitter 20 waits again until a predetermined period of time set on the basis of the time interval T2 has elapsed (S111), and performs short-term power transmission (S112). The power transmitter 20 repeats this control until the MPU 211 cannot perform power transmission stop demodulation.

When the MPU 211 cannot perform power transmission stop demodulation (NO in S113), the power transmitter 20 restarts (starts) power transmission (S114). That is, the power transmitter 20 restarts (starts) continuous power transmission to charge the battery 37 in the power receiver 30.

(Power Supply Control According to Third Aspect)

Figure 10:
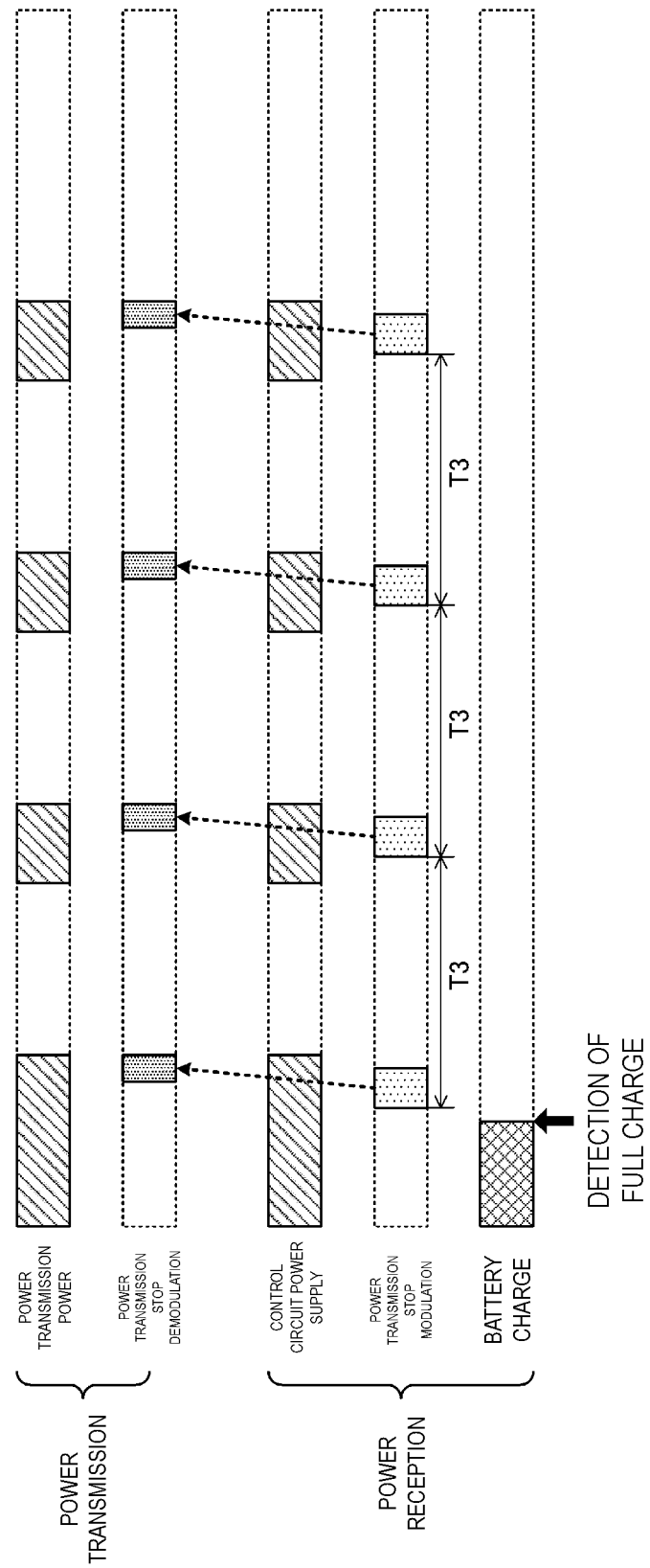
FIG. 10 is a time chart of power supply control according to a third aspect performed by a wireless power supply system.

FIG. 10 is a time chart of power supply control according to the third aspect performed by a wireless power supply system. The third aspect illustrated in FIG. 10 is an example of repeat control of generation of a power transmission stop signal performed by the power receiver 30.

When the battery 37 is fully charged by continuous power transmission from the power transmitter 20, the power reception control unit 35 detects the full charge and generates a power transmission stop signal. A power transmission stop signal is transmitted from the power receiver 30 to the power transmitter 20 using resonance modulation between the power receiver 30 and the power transmitter 20. At that time, the power transmitter 20 performs power transmission only for a period of time (short period) in which the stop of power transmission represented by the resonance modulation can be detected. When the MPU 211 performs power transmission stop demodulation, the power transmitter 20 stops the transmission of power to the power receiver 30.

After detecting the full charge, the power reception control unit 35 in the power receiver 30 generates a power transmission stop signal at predetermined time intervals T3. The power transmitter 20 continues the stop of continuous transmission of power to the power receiver 30 each time the MPU 211 performs power transmission stop demodulation.

With this configuration, the power receiver 30 can periodically notify the power transmitter 20 that there is no need to charge the battery 37 after the battery 37 has been fully charged. At that time, the power receiver 30 and the power transmitter 20 can operate only with power required for the transmission of a power transmission stop signal. Accordingly, the unnecessary power consumption of the power receiver 30 and the power transmitter 20 can be prevented.

Figure 11:
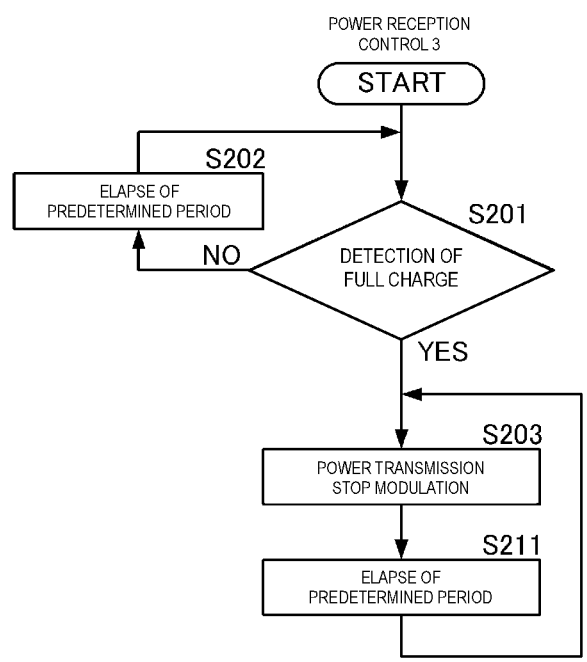
FIG. 11 is a flowchart of control according to the third aspect performed by the power receiver.

In this power supply control according to the third aspect, the power receiver 30 performs, for example, the following process flow. FIG. 11 is a flowchart of control according to the third aspect performed by a power receiver. In the flowchart in FIG. 11, the process to step S203 is the same as that in FIG. 7, and the description of the same point will be omitted. The power transmitter 20 performs the above control illustrated in FIG. 9.

When the power receiver 30 detects the full charge of the battery 37, it causes resonance modulation representing the stop of power transmission (S203) and waits until a predetermined period of time has elapsed (S211). After the predetermined period of time has elapsed (S211), the power receiver 30 causes resonance modulation representing the stop of power transmission (S203). Subsequently, the power receiver 30 repeats the above control.

(Power Supply Control According to Fourth Aspect)

Figure 12:
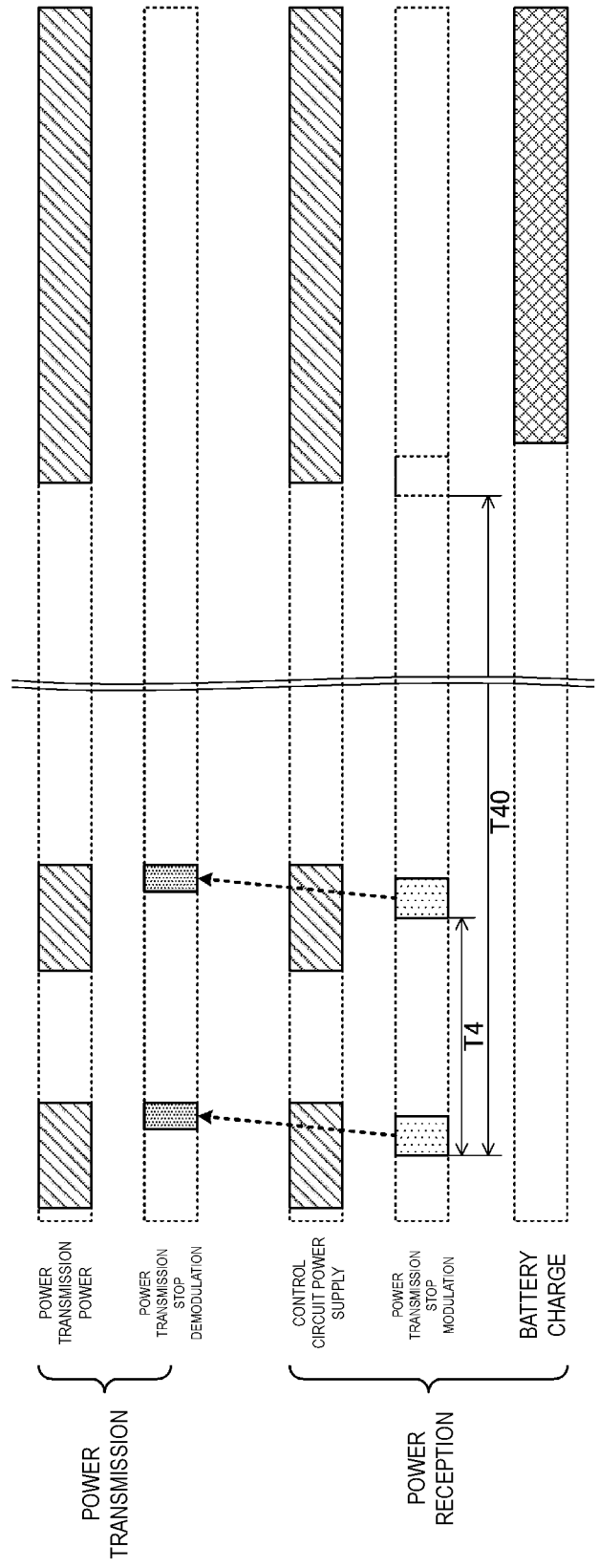
FIG. 12 is a time chart of power supply control according to a fourth aspect performed by a wireless power supply system.

FIG. 12 is a time chart of power supply control according to the fourth aspect performed by a wireless power supply system. The fourth aspect illustrated in FIG. 12 is an example of repeat control of generation of a power transmission stop signal performed by the power receiver 30.

Like in the above power supply control according to the third aspect, the power reception control unit 35 in the power receiver 30 generates a power transmission stop signal at predetermined time intervals T4 after detecting full charge. The power transmitter 20 continues the stop of continuous power transmission to the power receiver 30 each time the MPU 211 performs power transmission stop demodulation.

The power reception control unit 35 in the power receiver 30 stops the generation of a power transmission stop signal upon the elapse of a threshold time T40 from the generation of a first power transmission stop signal performed in response to the detection of full charge. When the MPU 211 cannot power transmission stop demodulation, the power transmitter 20 starts (restarts) continuous power transmission to the power receiver 30.

By performing the above control using the above configuration, the wireless power supply system can automatically restart the charge of the battery 37 after the battery 37 has been fully charged and the threshold time T40 has elapsed. In a period until the charge of the battery 37 is restarted, the power receiver 30 and the power transmitter 20 can operate only with power required for the transmission of a power transmission stop signal. Accordingly, the unnecessary power consumption of the power receiver 30 and the power transmitter 20 can be prevented.

Figure 13:
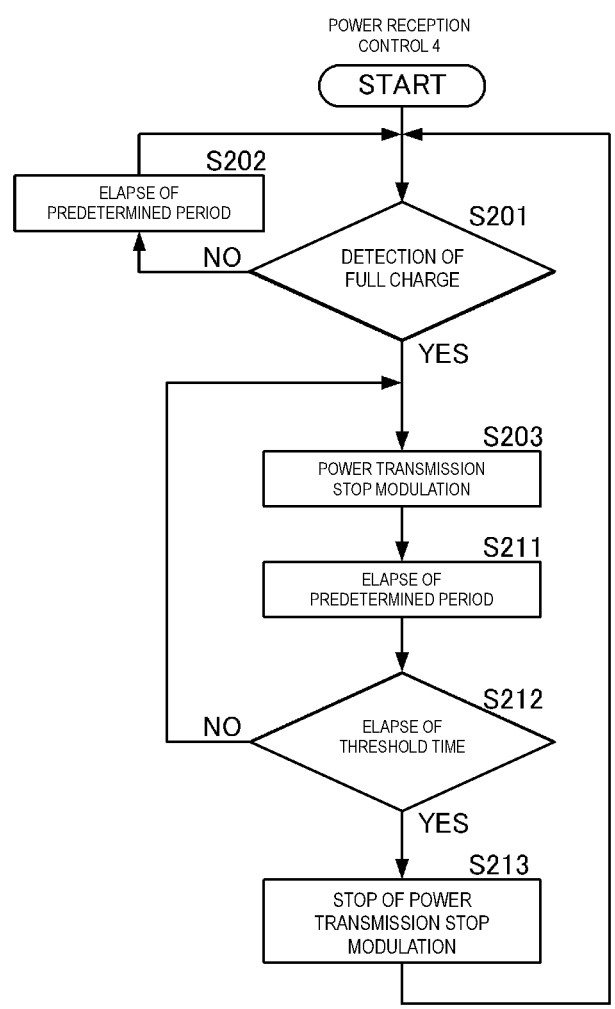
FIG. 13 is a flowchart of control according to the fourth aspect performed by the power receiver.

In this power supply control according to the fourth aspect, the power receiver 30 performs, for example, the following process flow. FIG. 13 is a flowchart of control according to the fourth aspect performed by a power receiver. In the flowchart in FIG. 13, the process to step S203 is the same as that in FIG. 7, and the description of the same point will be omitted. The power transmitter 20 performs the above control illustrated in FIG. 9.

When the power receiver 30 detects the full charge of the battery 37, it causes resonance modulation representing the stop of power transmission (S203) and waits until a predetermined period of time has elapsed (S211). After the predetermined period of time has elapsed (S211) and before a threshold time has yet to elapse (NO in S212), the power receiver 30 causes resonance modulation representing the stop of power transmission (S203). Subsequently, the power receiver 30 repeats the above control until the threshold time has elapsed.

Upon the elapse of the threshold time (YES in S212), the power receiver 30 stops power transmission stop modulation (S213). The power transmission of the power transmitter 20 performed for the charge of the battery 37 is restarted, and the power receiver 30 therefore starts to detect full charge again (S201).

(Power Supply Control According to Fifth Aspect)

Figure 14:
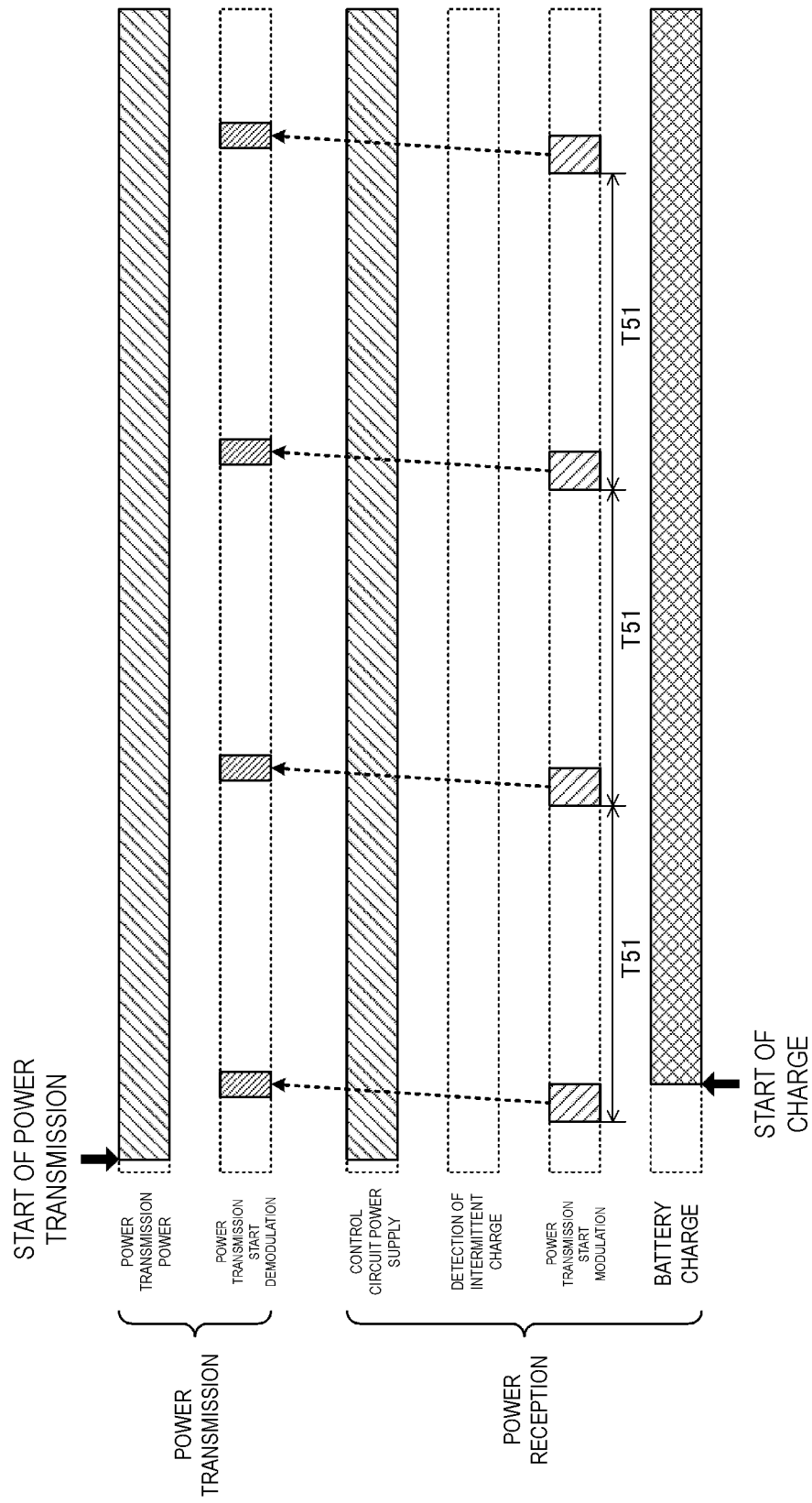
FIG. 14 is a diagram illustrating exemplary control according to a fifth aspect at the time of start of power transmission.
Figure 15:
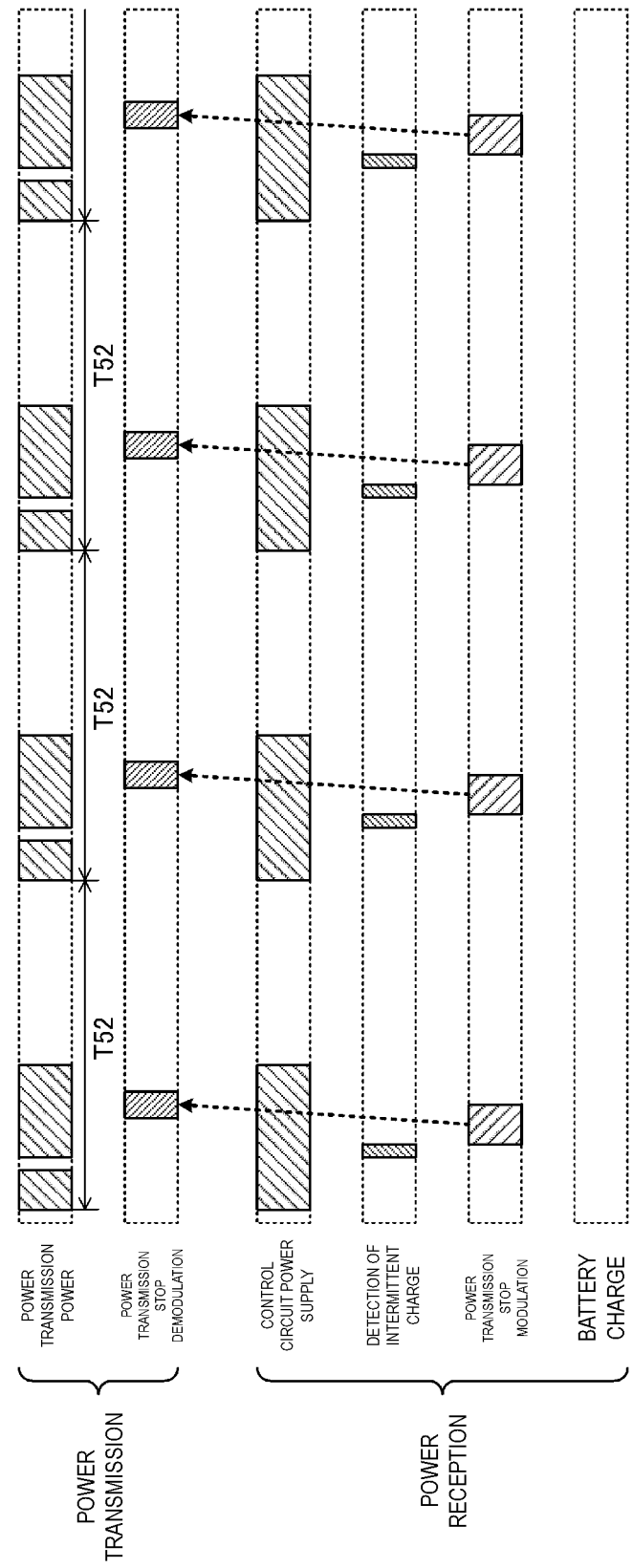
FIG. 15 is a diagram illustrating exemplary control according to the fifth aspect at the time of stop of power transmission.
Figure 16:
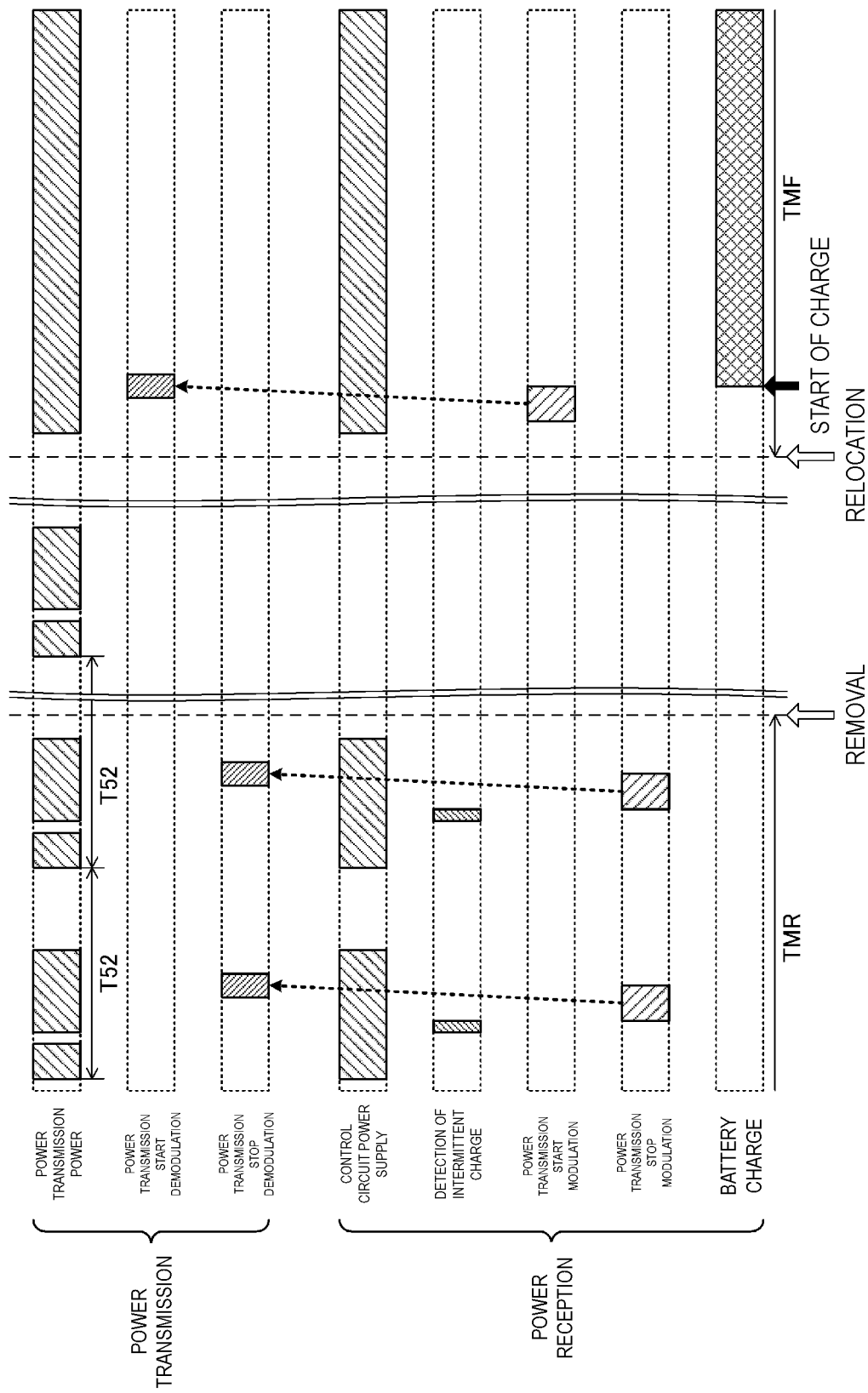
FIG. 16 is a diagram illustrating exemplary control according to the fifth aspect in a period from stop to start of power transmission.

FIGS. 14, 15, and 16 are time charts of power supply control according to the fifth aspect performed by a wireless power supply system.

(Control according to the Fifth Aspect at the Time of Start of Charge)

FIG. 14 is a diagram illustrating exemplary control according to the fifth aspect at the time of start of power transmission. This control is performed in, for example, a yet-to-be-charged state and a charge initial state of the battery 37. This control is, for example, the control performed in a period until the initial full charge illustrated in FIG. 4.

As illustrated in FIG. 14, the power transmitter 20 is in the power-on state, and the power transmitter 20 and the power receiver 30 are disposed such that the magnetic resonance between the power transmission coil 231 and the power reception coil 311 can be established. In this state, the power transmitter 20 starts power transmission. The power receiver 30 supplies power to the power reception control unit 35 with a power reception direct-current power supply. The power reception control unit 35 generates a power transmission start signal. At the same time, the power reception control unit 35 starts to charge the battery 37 via the charge circuit 36.

When the MPU 211 in the power transmitter 20 performs power transmission start demodulation, it performs continuous power transmission.

The power reception control unit 35 generates a power transmission start signal at predetermined time intervals T51 during charge. The MPU 211 in the power transmitter 20 performs continuous power transmission while performing power transmission start demodulation.

(Charge Stop Control According to Fifth Aspect)

FIG. 15 is a diagram illustrating control according to the fifth aspect at the time of stop of power transmission. This control is performed after power transmission has been stopped once because of the full charge of the battery 37. For example, this control is, for example, the control performed in a period TMR in FIG. 4.

As illustrated in FIG. 15, the MPU 211 in the power transmitter 20 performs intermittently-controlled short-term power transmission after the battery 37 has been fully charged and power transmission has been stopped. The intermittent control is control processing for temporarily stopping power transmission during short-term power transmission.

The power reception control unit 35 in the power receiver 30 detects that there is a discontinuous portion in short-term power transmission. The power reception control unit 35 detects a discontinuous portion in short-term power transmission by detecting a change in the output voltage of the intermittent power reception detection circuit 34.

The power reception control unit 35 compares the battery voltage VBAT and the charge start voltage VR. The power reception control unit 35 detects a discontinuous portion in short-term power transmission and generates a power transmission stop signal when the battery voltage VBAT is higher than or equal to the charge start voltage VR.

The MPU 211 in the power transmitter 20 performs power transmission stop demodulation to stop short-term power transmission.

Subsequently, the MPU 211 performs intermittently-controlled short-term power transmission at predetermined time intervals T52. The MPU 211 repeatedly performs intermittently-controlled short-term power transmission while performing power transmission stop demodulation.

(Control according to Fifth Aspect in Period from Removal to Relocation of the Power Receiver 30)

FIG. 16 is a diagram illustrating exemplary control according to the fifth aspect in a period from stop to start of power transmission. For example, this control is performed upon the relocation of the power receiver 30 at a power reception position after the battery 37 in the power receiver 30 has been fully charged and the power receiver 30 has been removed from the power reception position.

As illustrated in FIG. 16, the MPU 211 in the power transmitter 20 performs intermittently-controlled short-term power transmission (the control in the period TMR) after the battery 37 has been fully charged and power transmission has been stopped like in the case illustrated in FIG. 15.

The power reception control unit 35 in the power receiver 30 detects a discontinuous portion in short-term power transmission and generates a power transmission stop signal when the battery voltage VBAT is higher than or equal to the charge start voltage VR. The MPU 211 in the power transmitter 20 performs power transmission stop demodulation to stop short-term power transmission.

Even when the power receiver 30 has been removed, the MPU 211 in the power transmitter performs intermittently-controlled short-term power transmission at the predetermined time intervals T52. When the power receiver 30 is removed, a power transmission stop signal is not generated. Accordingly, the MPU 211 cannot perform power transmission stop demodulation. When the MPU 211 cannot perform power transmission stop demodulation, it stops intermittently-controlled short-term power transmission. The MPU 211 performs short-term power transmission in which intermittent control is not performed.

When the power receiver 30 is relocated, the power reception control unit 35 in the power receiver 30 receives the supply of power from the power transmitter 20 and generates a power transmission start signal like in the above case illustrated in FIG. 14. The MPU 211 in the power transmitter 20 performs power transmission start demodulation to perform continuous power transmission. The charge circuit 36 in the power receiver 30 starts to charge the battery 37. Subsequently, the power reception control unit 35 repeats power reception and charge until detecting that the battery voltage VBAT is higher than or equal to the full charge voltage VF (control in a period TMF).

By performing the above control using the above configuration, a wireless power supply system can detect whether, after the power receiver 30 has been fully charged, the power receiver 30 stays at a power reception position or is removed and then relocated at the power reception position with certainty. The power transmitter 20 can perform power transmission control suitable for the respective cases. Accordingly, the unnecessary power consumption of the power transmitter 20 can be prevented.

Figure 17:
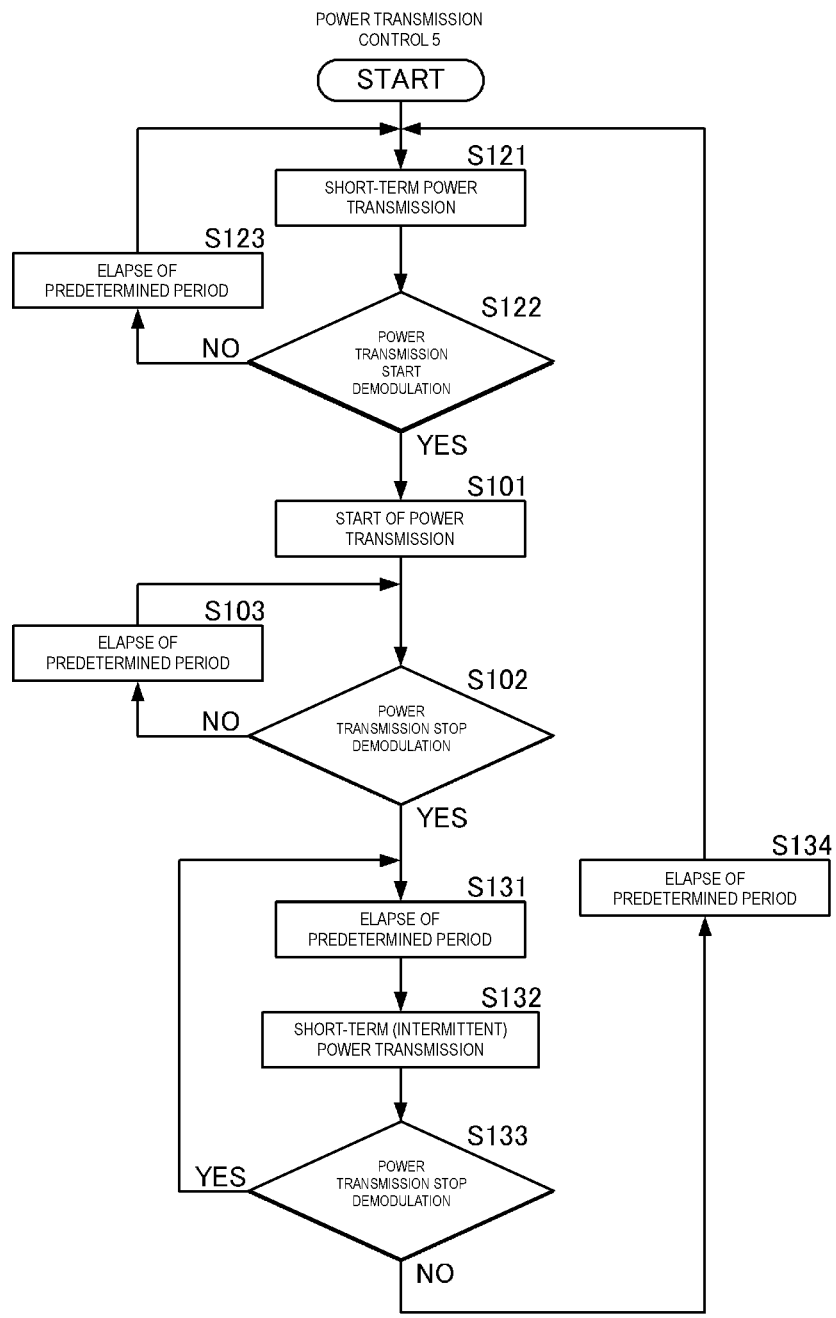
FIG. 17 is a flowchart of control according to the fifth aspect performed by the power transmitter.

In this power supply control according to the fifth aspect, the power transmitter 20 performs, for example, the following process flow. FIG. 17 is a flowchart of control according to the fifth aspect performed by the power transmitter 20.

The power transmitter 20 performs short-term power transmission (S121). When the power transmitter 20 does not perform power transmission start demodulation (NO in S122), it repeats short-term power transmission.

When the power transmitter 20 performs power transmission start demodulation (YES in S122), it starts continuous power transmission (S101). When the power transmitter 20 does not perform power transmission stop demodulation during the continuous power transmission (NO in S102), it determines whether power transmission stop demodulation is performed after a predetermined period has elapsed (S103). When power transmission stop demodulation cannot be performed, power transmission is continuously performed.

After performing power transmission stop demodulation (YES in S102), the power transmitter 20 performs intermittently-controlled short-term power transmission (short-term (intermittent) power transmission) (S132) after a predetermined period has elapsed (S131). When the power transmitter 20 performs power transmission stop demodulation (YES in S133), it performs intermittently-controlled short-term power transmission again (S132) after a predetermined period has elapsed (S131). When the power transmitter 20 cannot perform power transmission stop demodulation (NO in S133), it stops intermittently-controlled short-term power transmission. After a predetermined period has elapsed (S134), the power transmitter 20 performs short-term power transmission (S121).

Figure 18:
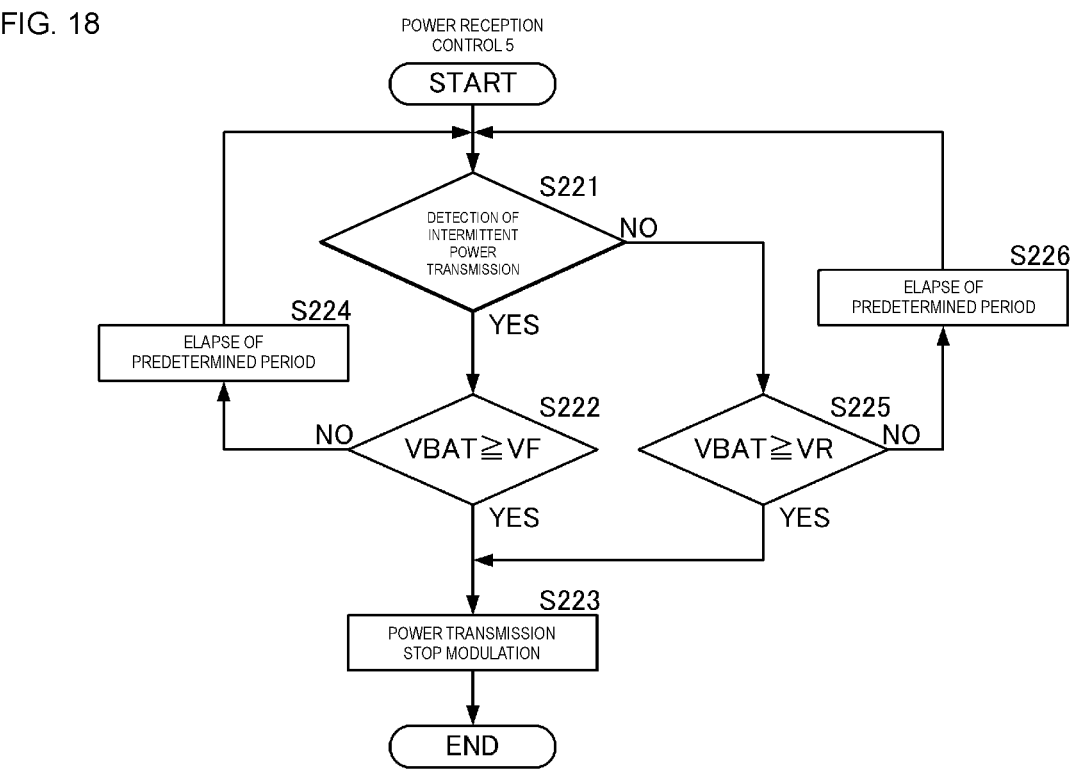
FIG. 18 is a flowchart of control according to the fifth aspect performed by the power receiver.

In this power supply control according to the fifth aspect, the power receiver 30 performs, for example, the following process flow. FIG. 18 is a flowchart of control according to the fifth aspect performed by the power receiver 30.

When the power receiver 30 detects intermittently-controlled short-term power transmission (YES in S221), it detects whether the battery voltage VBAT is higher than or equal to the full charge voltage VF. When the battery voltage VBAT is higher than or equal to the full charge voltage VF (YES in S222), the power receiver 30 performs power transmission stop modulation (S223). When the battery voltage VBAT is lower than the full charge voltage VF (NO in S222), the power receiver 30 detects intermittently-controlled short-term power transmission (S221) after a predetermined period has elapsed (S224).

When the power receiver 30 does not detect intermittently-controlled short-term power transmission (NO in S221), it detects whether the battery voltage VBAT is higher than or equal to the charge start voltage VR. When the battery voltage VBAT is higher than or equal to the charge start voltage VR (YES in S225), the power receiver 30 performs power transmission stop modulation (S223). When the battery voltage VBAT is lower than the charge start voltage VR (NO in S225), the power receiver 30 detects intermittently-controlled short-term power transmission (S221) after a predetermined period has elapsed (S226).

(Power Receiver According to Another Aspect)

Figures 19A, 19B:
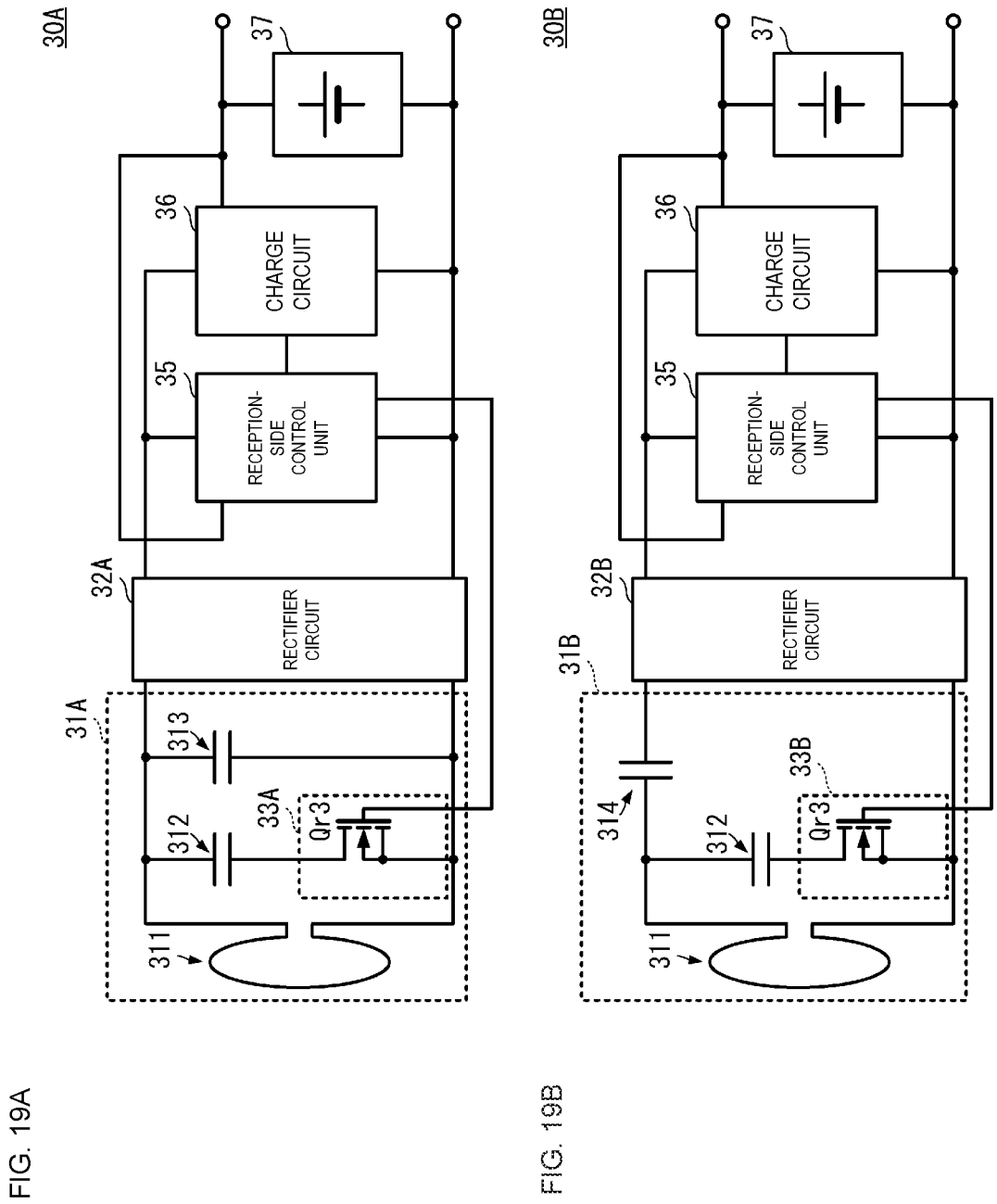
FIG. 19A is a diagram illustrating a power receiver according to another aspect.
FIG. 19B is a diagram illustrating a power receiver according to another aspect.

In the above power receiver 30, the resonance modulation circuit 33 is disposed in the power reception power conversion circuit 32. However, in the power receiver, a resonance modulation circuit may be disposed in a power reception resonant circuit. FIG. 19A is a diagram illustrating a power receiver 30A according to another aspect. FIG. 19B is a diagram illustrating a power receiver 30B according to another aspect.

As illustrated in FIG. 19A, the power receiver 30A includes a power reception resonant circuit 31A, a rectifier circuit 32A, a resonance modulation circuit 33A, the power reception control unit 35, the charge circuit 36, and the battery 37.

The power reception resonant circuit 31A includes the power reception coil 311, the resonant capacitor 312, and a resonant capacitor 313. The resonant capacitors 312 and 313 are connected in parallel with the power reception coil 311. The resonance modulation circuit 33A includes a switching element Qr3. The switching element Qr3 is connected in series with the resonant capacitor 312.

In this configuration, the mode of connection of the resonant capacitor 312 with respect to the power reception coil 311 is changed by turning on or off the switching element Qr3. As a result, the power receiver 30A can cause resonance modulation.

As illustrated in FIG. 19B, the power receiver 30B includes a power reception resonant circuit 31B, a rectifier circuit 32B, a resonance modulation circuit 33B, the power reception control unit 35, the charge circuit 36, and the battery 37.

The power reception resonant circuit 31B includes the power reception coil 311, the resonant capacitor 312, and a resonant capacitor 314. The resonant capacitor 312 is connected in parallel with the power reception coil 311. The resonant capacitor 314 is connected in series with one end of the power reception coil 311. The resonance modulation circuit 33B includes the switching element Qr3. The switching element Qr3 is connected in series with the resonant capacitor 312.

In this configuration, the mode of connection of the resonant capacitor 312 with respect to the power reception coil 311 is changed by turning on or off the switching element Qr3. As a result, the power receiver 30B can cause resonance modulation.

Each of the rectifier circuit 32A illustrated in FIG. 19A and the rectifier circuit 32B illustrated in FIG. 19B corresponds to a power reception power conversion circuit, and can be formed by, for example, a half-wave rectifier circuit, a voltage doubling rectifier circuit, or a full-wave rectifier circuit.

What is claimed is:

1. A wireless power supply system comprising:
   a power transmitter including a power transmission power conversion circuit configured to convert a power transmission direct-current power supply into high-frequency power, a power transmission resonant circuit including a power transmission coil configuring the power transmission power conversion circuit, and a power transmission control circuit configured to control the power transmission power conversion circuit; and
   a power receiver including a power reception resonant circuit that includes a power reception coil and can be electromagnetically coupled to the power transmission resonant circuit, a power reception power conversion circuit configured to convert the high-frequency power received by the power reception resonant circuit into a power reception direct-current power supply, and a battery configured to be charged with the power reception direct-current power supply,
   wherein the power receiver includes a power reception control circuit and a power reception resonance modulation circuit, the power reception control circuit including a charge state detection circuit configured to detect a state of charge of the battery and generate a power transmission stop signal based on a state of charge of the battery detected by the charge state detection circuit, the power reception resonance modulation circuit being configured to change resonance conditions by changing an input impedance when the power reception resonant circuit is viewed from the power transmission resonant circuit in response to the power transmission stop signal, the power transmitter includes an electric variable detection circuit configured to detect an electric variable from the power transmission direct-current power supply due to a change in the resonance conditions, the power transmission control circuit is configured to demodulate the power transmission stop signal based on the electric variable detected by the electric variable detection circuit and stop an operation of supplying the high-frequency power in the power transmission power conversion circuit for a predetermined period, and the power reception control circuit in the power receiver is configured to cause the power reception resonance modulation circuit to perform an operation based on generation of the power transmission stop signal at predetermined time intervals while a full-charge state of the battery is detected.

2. The wireless power supply system according to claim 1, wherein the power transmission control circuit in the power transmitter is configured to continuously stop supplying the high-frequency power while demodulation of the power transmission stop signal is continued.

3. The wireless power supply system according to claim 1, wherein in a period from a start of generation of the power transmission stop signal to a time at which a voltage of the power reception direct-current power supply is greater than or equal to a threshold value used for determination of whether charge is to be restarted, the power reception control circuit in the power receiver is configured to continue the generation of the power transmission stop signal when the high-frequency power is received.

4. The wireless power supply system according to claim 1, wherein upon detecting that a voltage of the power reception direct-current power supply is less than a threshold value used for determination of whether charge is to be restarted after generation of the power transmission stop signal has started, the power reception control circuit in the power receiver is configured to stop the generation of the power transmission stop signal when the high-frequency power is received.

5. The wireless power supply system according to claim 3, wherein the power transmitter is configured to intermittently supply the high-frequency power after demodulation of the power transmission stop signal, and upon receiving the intermittently supplied high-frequency power, the power receiver is configured to generate the power transmission stop signal.

6. The wireless power supply system according to claim 5, wherein when the power transmitter cannot demodulate the power transmission stop signal a predetermined number of times while continuing an operation of intermittently supplying the high-frequency power, the power transmitter is configured to continuously supply the high-frequency power.

7. The wireless power supply system according to claim 2, wherein in a period from a start of generation of the power transmission stop signal to a time at which a voltage of the power reception direct-current power supply is greater than or equal to a threshold value used for determination of whether charge is to be restarted, the power reception control circuit in the power receiver is configured to continue the generation of the power transmission stop signal when the high-frequency power is received.

8. The wireless power supply system according to claim 2, wherein upon detecting that a voltage of the power reception direct-current power supply is less than a threshold value used for determination of whether charge is to be restarted after generation of the power transmission stop signal has started, the power reception control circuit in the power receiver is configured to stop the generation of the power transmission stop signal when the high-frequency power is received.

9. The wireless power supply system according to claim 3, wherein upon detecting that a voltage of the power reception direct-current power supply is less than a threshold value used for determination of whether charge is to be restarted after generation of the power transmission stop signal has started, the power reception control circuit in the power receiver is configured to stop the generation of the power transmission stop signal when the high-frequency power is received.

10. The wireless power supply system according to claim 7, wherein upon detecting that a voltage of the power reception direct-current power supply is less than a threshold value used for determination of whether charge is to be restarted after generation of the power transmission stop signal has started, the power reception control circuit in the power receiver is configured to stop the generation of the power transmission stop signal when the high-frequency power is received.

11. The wireless power supply system according to claim 7, wherein the power transmitter is configured to intermittently supply the high-frequency power after demodulation of the power transmission stop signal, and upon receiving the intermittently supplied high-frequency power, the power receiver is configured to generate the power transmission stop signal.

12. The wireless power supply system according to claim 11, wherein when the power transmitter cannot demodulate the power transmission stop signal a predetermined number of times while continuing an operation of intermittently supplying the high-frequency power, the power transmitter is configured to continuously supply the high-frequency power.

13. A wireless power supply system comprising:

a power transmitter including a power transmission power conversion circuit configured to convert a power transmission direct-current power supply into high-frequency power, a power transmission resonant circuit including a power transmission coil configuring the power transmission power conversion circuit, and a power transmission control circuit configured to control the power transmission power conversion circuit; and a power receiver including a power reception resonant circuit that includes a power reception coil and can be electromagnetically coupled to the power transmission resonant circuit, a power reception power conversion circuit configured to convert the high-frequency power received by the power reception resonant circuit into a power reception direct-current power supply, and a battery configured to be charged with the power reception direct-current power supply, wherein the power receiver includes a power reception control circuit and a power reception resonance modulation circuit, the power reception control circuit including a charge state detection circuit configured to detect a state of charge of the battery and generate a power transmission stop signal based on a state of charge of the battery detected by the charge state detection circuit, the power reception resonance modulation circuit being configured to change resonance conditions by changing an input impedance when the power reception resonant circuit is viewed from the power transmission resonant circuit in response to the power transmission stop signal, the power transmitter includes an electric variable detection circuit configured to detect an electric variable from the power transmission direct-current power supply due to a change in the resonance conditions, the power transmission control circuit is configured to demodulate the power transmission stop signal based on the electric variable detected by the electric variable detection circuit and stop an operation of supplying the high-frequency power in the power transmission power conversion circuit for a predetermined period, and in a period from a start of generation of the power transmission stop signal to a time at which a voltage of the power reception direct-current power supply is greater than or equal to a threshold value used for determination of whether charge is to be restarted, the power reception control circuit in the power receiver is configured to continue the generation of the power transmission stop signal when the high-frequency power is received.

14. A wireless power supply system comprising:

a power transmitter including a power transmission power conversion circuit configured to convert a power transmission direct-current power supply into high-frequency power, a power transmission resonant circuit including a power transmission coil configuring the power transmission power conversion circuit, and a power transmission control circuit configured to control the power transmission power conversion circuit; and a power receiver including a power reception resonant circuit that includes a power reception coil and can be electromagnetically coupled to the power transmission resonant circuit, a power reception power conversion circuit configured to convert the high-frequency power received by the power reception resonant circuit into a power reception direct-current power supply, and a battery configured to be charged with the power reception direct-current power supply, wherein the power receiver includes a power reception control circuit and a power reception resonance modulation circuit, the power reception control circuit including a charge state detection circuit configured to detect a state of charge of the battery and generate a power transmission stop signal based on a state of charge of the battery detected by the charge state detection circuit, the power reception resonance modulation circuit being configured to change resonance conditions by changing an input impedance when the power reception resonant circuit is viewed from the power transmission resonant circuit in response to the power transmission stop signal, the power transmitter includes an electric variable detection circuit configured to detect an electric variable from the power transmission direct-current power supply due to a change in the resonance conditions, the power transmission control circuit is configured to demodulate the power transmission stop signal based on the electric variable detected by the electric variable detection circuit and stop an operation of supplying the high-frequency power in the power transmission power conversion circuit for a predetermined period, and upon detecting that a voltage of the power reception direct-current power supply is less than a threshold value used for determination of whether charge is to be restarted after generation of the power transmission stop signal has started, the power reception control circuit in the power receiver is configured to stop the generation of the power transmission stop signal when the high-frequency power is received.

\* \* \* \* \*